Figures 1, 2:
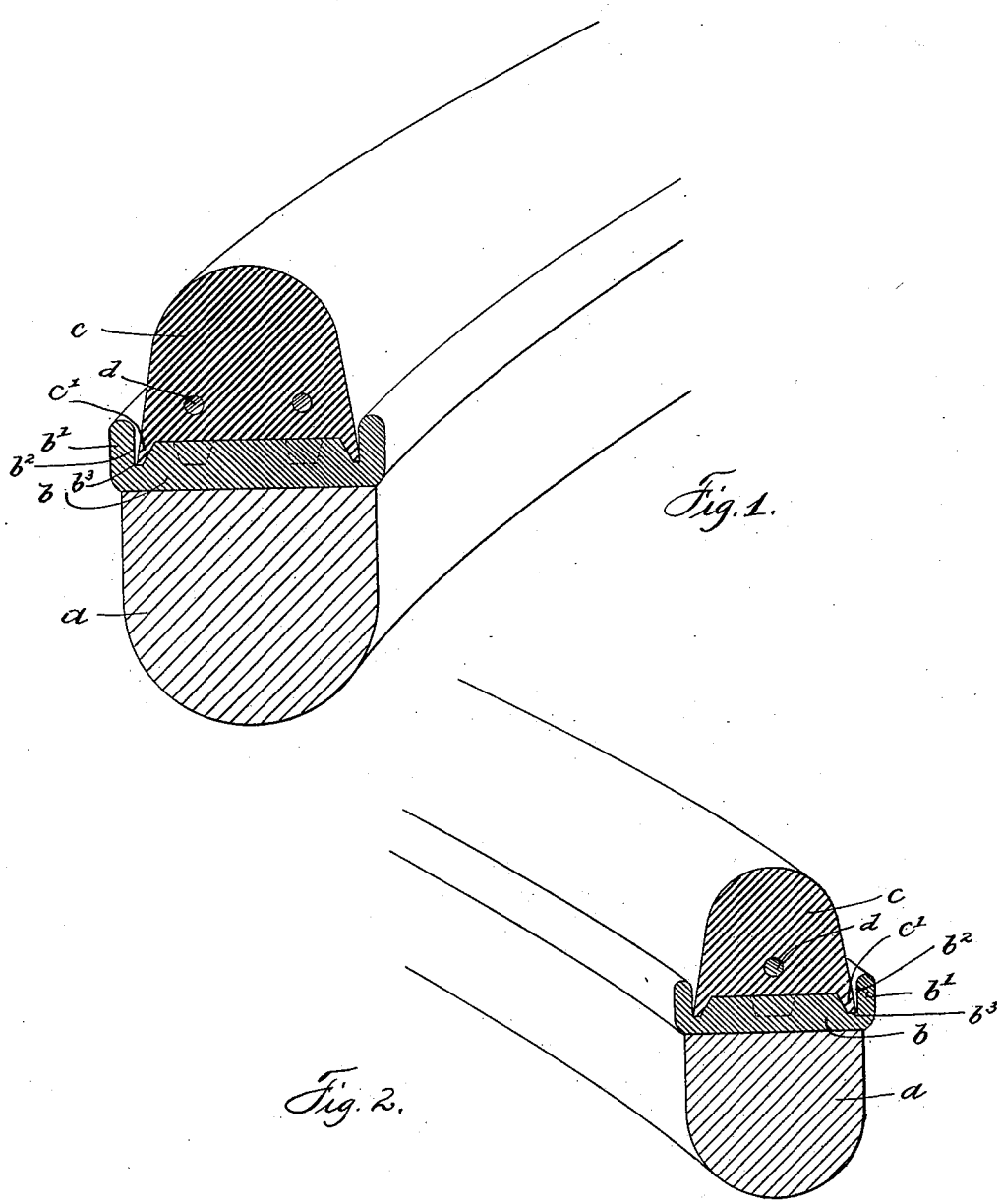

No. 645,481. Patented Mar. 13, 1900.
S. S. MILLER.
CUSHION TIRE.
(Application filed Nov. 20, 1899.)

(No Model.)

WITNESSES:
John E. Burch.
Geo. M. Cofsenhaver.

INVENTOR
Stephen S. Miller,
BY
Finckel & Finckel
ATTORNEYS.

UNITED STATES PATENT OFFICE.

STEPHEN SAMUEL MILLER, OF AKRON, OHIO.

CUSHION-TIRE.

SPECIFICATION forming part of Letters Patent No. 645,481, dated March 13, 1900.

Application filed November 20, 1899. Serial No. 737,663. (No model.)

*To all whom it may concern:*

Be it known that I, STEPHEN SAMUEL MILLER, a citizen of the United States, residing at Akron, in the county of Summit and State of Ohio, have invented certain new and useful Improvements in Cushion-Tires; and I do hereby declare the following to be a full, clear, and exact description of the invention, such as will enable others skilled in the art to which it appertains to make and use the same.

As heretofore placed upon the market the metallic channel-rims for seating rubber tires have been made comparatively deep, with their peripheries lying in circles parallel to the most compressible portion of the rubber. Hence under the weight of the vehicle and its load the tire has bulged out over the flanges, cutting and damaging the tire badly. It has been proposed to do away altogether with flanges on the metallic rim; but this has been found objectionable, because it is impracticable to avoid two undesirable consequences—first, displacement of the tire upon severe side thrust, and, second, the lodgment of sand, gravel, water, and other destructive agents between the tire and rim. It is the purpose of my present invention to overcome these objections by providing an improved form in which the metallic rim has flanges, but of relatively-small height, with wedge-shaped grooves at the inner side of their bases to receive lips or wings of a solid rubber tire of the form hereinafter particularly set forth and claimed.

In the accompanying drawings, illustrating embodiments of my invention, Figure 1 is a perspective view, the end being in section, of a fraction of a tire, channel, and felly as adapted to vehicle-wheels of the large and heavy kind, holes for two retaining-bands being shown. Fig. 2 is a similar view showing an adaptation of the invention to small or light wheels.

In the views, $a$ designates the usual felly, upon which I put a metallic rim $b$, having its base or body portion rather thick and its bottom or tire-seat in a general aspect flat or straight in cross-section and provided at its outer sides or edges with shallow outwardly-extending flanges $b'$, forming a shallow channel around the wheel. These flanges are shown to have their inner sides standing substantially at right angles to the bottom of the channel, as indicated at $b^2$, and adjacent to said flanges in the body of the rim are formed grooves $b^3$. Right-angled flanges afford better abutments to resist the lateral side thrusts upon the tire.

The elastic or cushion tire $c$, commonly made of rubber, is of the solid kind and has formed on its base or inner side lips or wings $c'$, that project flaringly from the corners thereof and fit in the grooves $b^3$ of the metallic channel, so that their outer sides shall stand slightly removed from the inner sides of the flanges. The outer part or tread of the tire is rounding, as usual. The holes $d$ for the retaining-bands may be one or more in number. In light wheels one will suffice, as indicated in Fig. 2; but in heavy wheels two are best employed, as indicated in Fig. 1.

The bottom of the channel may be provided with one or more supplementary grooves or channels located in the plane of the retaining-bands, as indicated in broken lines; but when these additional grooves or channels are provided the rubber tire should be formed with integral beads or projections to enter them. These beads will serve to strengthen the rubber in the plane of the retaining-wires and aid in holding the tire firmly in the channel.

It will be observed that the shallow flanges of the metallic rim, while not interfering with the expansion of the sides of the tire, effectually prevent its complete dislodgment under lateral thrusts and that the lips or wings $c'$ preclude the ingress of sand, gravel, water, and other things between the under side of the tire and the bottom of the channel. Further, it is well known that a tire is frequently lifted bodily at one side by lateral thrusts, and in this event the lips or wings $c'$, by reason of their depth and flexibility, remain like the packing of a valve against the inner side of the flange, so that even under such extraordinary conditions sand, water, &c., are excluded. The slight separation of the sides of the tire and its wings from the inner walls of the flanges permits the free movement of the wings when the tire is lifted by side thrust and the certain restoration of the tire to its seat after having been so lifted.

What I claim, and desire to secure by Letters Patent, is—

In a wheel, a channel for a cushion-tire having a flat bottom and flanges the inner sides of which are perpendicular to that bottom, grooves $b^3$ adjacent the flanges in the bottom of said channel having their inner sides inclined to the perpendicular sides of the flanges, combined with a solid rubber tire having a flat bottom to fit upon the bottom of the channel and lips or wings $c'$ projecting from the corners of said tire and entering said grooves and sloping from the perpendicular sides of the flanges, substantially as shown and described.

In testimony whereof I affix my signature in presence of two witnesses.

STEPHEN SAMUEL MILLER.

Witnesses:
THOMAS C. MARSHALL,
WILLIAM D. WISELL.